(12) United States Patent
Shaout et al.

(10) Patent No.: US 9,584,646 B2
(45) Date of Patent: Feb. 28, 2017

(54) REMOTE INTERFACE DEVICE FOR VEHICULAR REMOTE CONTROL

(71) Applicant: The Regents of The University of Michigan, Ann Arbor, MI (US)

(72) Inventors: Adnan K. Shaout, Dearborn, MI (US); Munther Al-Sawah, West Bloomfield, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 14/865,994

(22) Filed: Sep. 25, 2015

(65) Prior Publication Data

US 2016/0094699 A1 Mar. 31, 2016

Related U.S. Application Data

(60) Provisional application No. 62/055,009, filed on Sep. 25, 2014.

(51) Int. Cl.
*H04M 3/00* (2006.01)
*H04M 1/725* (2006.01)

(52) U.S. Cl.
CPC ...... *H04M 1/7253* (2013.01); *H04M 1/72533* (2013.01)

(58) Field of Classification Search
None
See application file for complete search history.

(56) References Cited

U.S. PATENT DOCUMENTS

| | | | |
|---|---|---|---|
| 4,296,334 A | 10/1981 | Wong | |
| 5,619,412 A | 4/1997 | Hapka | |
| 5,769,051 A | 6/1998 | Bayron et al. | |
| 5,951,440 A | 9/1999 | Reichlinger | |
| 6,028,372 A | 2/2000 | West et al. | |
| 6,351,703 B1 | 2/2002 | Avery, Jr. | |
| 6,860,248 B1 | 3/2005 | Mene | |
| 7,542,827 B2 | 6/2009 | Gerard et al. | |
| 7,702,451 B1 | 4/2010 | Crossley | |
| 8,489,085 B2 | 7/2013 | Simmons | |
| 8,630,747 B2 * | 1/2014 | Burcham | G06F 21/10 701/2 |
| 8,868,292 B2 | 10/2014 | Park et al. | |
| 9,062,617 B2 | 6/2015 | Mauti, Jr. | |
| 2004/0145241 A1 * | 7/2004 | Arakawa | B60R 25/102 307/10.3 |

(Continued)

*Primary Examiner* — Erika Washington
(74) *Attorney, Agent, or Firm* — Harness, Dickey & Pierce, PLC (57) ABSTRACT

A remote operation system remotely controls a vehicle. The system may include a RF receiver and a remote interface device. The RF receiver resides in the vehicle and receives RF commands via a RF communication link. The remote interface device may be packaged in a housing and installed in the vehicle. The remote interface device includes a cellular transceiver, a RF transmitter, and a controller. The cellular transceiver may receive a given command via a cellular communication link. The controller may retrieve the given command from the cellular transceiver, and translate the given command to a RF command. The controller may transmit the RF command to the RF receiver by way of the RF transmitter.

18 Claims, 6 Drawing Sheets

(56) References Cited

U.S. PATENT DOCUMENTS

| | | | |
|---|---|---|---|
| 2009/0212905 A1* | 8/2009 | Batz | B60G 17/017 |
| | | | 340/5.54 |
| 2009/0275362 A1* | 11/2009 | Tieman | B60R 25/102 |
| | | | 455/556.1 |
| 2010/0106363 A1 | 4/2010 | Mandujano | |
| 2013/0151132 A1 | 6/2013 | Harumoto et al. | |
| 2013/0160732 A1 | 6/2013 | Tucker | |
| 2013/0317693 A1* | 11/2013 | Jefferies | G07B 15/00 |
| | | | 701/31.5 |
| 2014/0074320 A1 | 3/2014 | Nishida | |
| 2014/0371951 A1 | 12/2014 | Michael | |

* cited by examiner

REMOTE INTERFACE DEVICE FOR VEHICULAR REMOTE CONTROL

CROSS-REFERENCE TO RELATED APPLICATIONS

This application claims the benefit of U.S. Provisional Application No. 62/055,009, filed on Sep. 25, 2014. The entire disclosure of the above application is incorporated herein by reference.

FIELD

The present disclosure relates to remote starters and alarm systems for remotely activating an operation of the vehicle.

BACKGROUND

Numerous car remote starters are available in automotive markets. There are more than 40 brands and 250 products available in the US market. The price can vary in range from $100 to $1000, based on the brand and the features chosen. Most of these products work over infrared signal and other types of short-range communications, which in most cases does not satisfy the customer needs nor cope with the revolution of long-distance communications.

On the other hand, remote starters with satellite capabilities cost a lot of money to own and install. On average, a user would pay around $500 to get a basic remote starter installed, and a monthly subscription payment to maintain the satellite service.

Therefore, it is desirable to develop a universal cellular-based device for implementing a vehicle remote starter and alarm system.

This section provides background information related to the present disclosure which is not necessarily prior art.

SUMMARY

This section provides a general summary of the disclosure, and is not a comprehensive disclosure of its full scope or all of its features.

The present disclosure is directed toward a remote operation system for remotely controlling a vehicle. The system may include a RF receiver and a remote interface device. The RF receiver may reside in a vehicle and may receive RF commands via a RF communication link. The remote interface device may be packaged in a housing and installed in the vehicle. The remote interface device may include a cellular transceiver, a RF transmitter, and a controller. The cellular transceiver may receive a given command via a cellular communication link. The RF transmitter may transmit a RF command over the RF communication link to the RF receiver. The controller may be interfaced with the cellular transceiver and the RF transmitter. The controller may retrieve the given command from the cellular transceiver and translate the given command to an RF command. The controller may interact with the RF transmitter to send the RF command to the RF receiver.

In another aspect of the present disclosure, a remote interface device may be located in a vehicle for controlling the vehicle. The remote interface device may include a transceiver, a RF transmitter, and a control module. The transceiver may include a processor and an antenna. The transceiver may receive a control command via cellular communication link. The RF transmitter may communicate with a RF receiver disposed in the vehicle. The control module may be coupled to the transceiver and to the RF transmitter. The control module may determine an operation request of the vehicle based on the control command received. The control module may transmit a RF command signal indicative of the operation request to the RF receiver via the RF transmitter when the operation request is to operate a component in the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The present disclosure will now be described more fully with reference to the accompanying drawings.

Typically, a user may control their vehicle by way of a key fob that operates within a short distance range of the vehicle. A system of the present disclosure includes a remote interface device that permits the user to operate the vehicle from a long distance.

Figure 1:
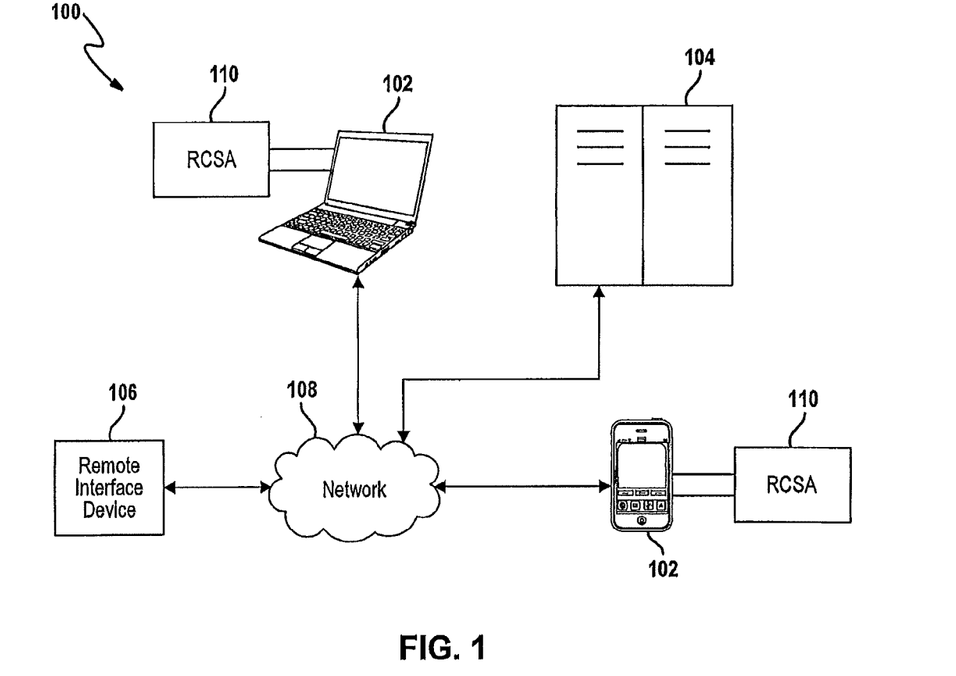
FIG. 1 illustrates a system for activating a vehicular action by way of a remote interface device.

With reference to FIG. 1, a remote operation system 100 includes one or more computing devices 102, a distribution center 104, and a remote interface device 106. The system 100 allows a user to remotely access their vehicle by way of the remote interface device 106. More particularly, the computing device 102, the distribution center 104, and the remote interface device 106 exchange data by way of a network 108, such as the Internet, cellular network, and/or other suitable wireless networks. Using the computing device 102, the user transmits a control command via the network 108 to the distribution center 104. The distribution center 104 forwards the control command to the remote interface device 106 disposed in the user's vehicle. As described in detailed below, the remote interface device 106 analyzes the control command and forwards the command to the appropriate device in the vehicle. In the example embodiment, the computing device 102 communicates with the remote interface device 106 by way of the distribution center 104. Alternatively, the computing device 102 may communicate directly to the remote interface device 106.

The computing device 102 may be a smartphone, a laptop, a tablet, and/or other suitable computer that has and executes a remote control software application (RCSA) 110. The remote control software application 110 allows the user to select one or more control commands available to the user for controlling the vehicle or determining the position of the vehicle. For example, the control commands available to the user may include: remote start/off, find vehicle's location, remote start timer, alarm on/off, windows up/down, and/or trunk opened/closed. The remote control software application 110 may provide a series of graphical user interfaces displayed by the computing device 102 for allowing the user to access the different command controls of the vehicle. The computing device 102 transmits a control information to the distribution center 104 via the network 108 as, for example, a transmission control protocol (TCP) packet. The control information may include data indicative of the selected control command and an identifier for identifying the remote interface device 106 installed in the user's vehicle (e.g., a unique pass-code). The computing device 102 having the remote control software application 110 may be referred to as a remote control device.

The distribution center 104 may include one or more servers. The distribution center 104 organizes and manages communication between users and respective remote interface devices 106. When the distribution center 104 receives the control information from the user's computing device 102, the distribution center 104 compares the associated pass-code (e.g., an identifier) provided in the control information with the information stored in a database of the distribution center 104. Once the distribution center 104 identifies the remote interface device 106, the distribution center 104 forwards the control command to the respective remote interface device 106. If the distribution center 104 does not find a match to the pass-code, then the distribution center 104 may discard the request and terminate the connection to the client.

Figure 2:
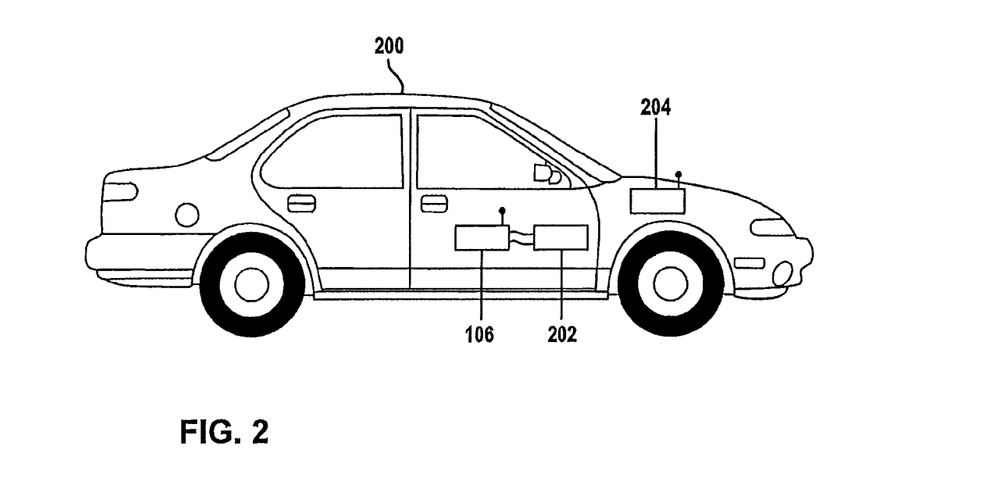
FIG. 2 illustrates a vehicle having the remote interface device of the present disclosure.

With reference to FIG. 2, the remote interface device 106 is located in a vehicle 200. The remote interface device 106 is electrically coupled to a vehicle battery 202. For example, the remote interface device 106 may connect to a power outlet provided in the vehicle, and therefore, can be a plug-in device. The remote interface device 106 wirelessly communicates with a vehicle control module 204 that is located in the vehicle. The remote interface device 106 and the vehicle control module 204 communicate via an RF based communication.

The vehicle control module 204 receives a control command (i.e., a RF signal) from the remote interface device 106 and/or a key fob (not shown) by way of a RF receiver. The vehicle control module 204 controls the operation of the vehicle based on the control command received. For example, the vehicle control module 204 determines the operation to be performed and transmits a command to the component to be operated. For instance, if the engine is to be turned on, the vehicle control module 204 may transmit a message to an engine control module by way of a vehicle network (e.g., CAN or LIN) requesting the engine control module to turn on the engine.

The vehicle control module 204 is the original module installed by the original equipment manufacturer for controlling an operation of the vehicle 200 (e.g., engine start/stop, alarm system, etc) based on a signal from a remote devices, such as a key fob and/or the remote interface device 106. Accordingly, the remote interface device 106 communicates with the vehicle control module 204 using the same method as the key fob and, therefore, does not require rewiring of the vehicle 200.

Figure 3:
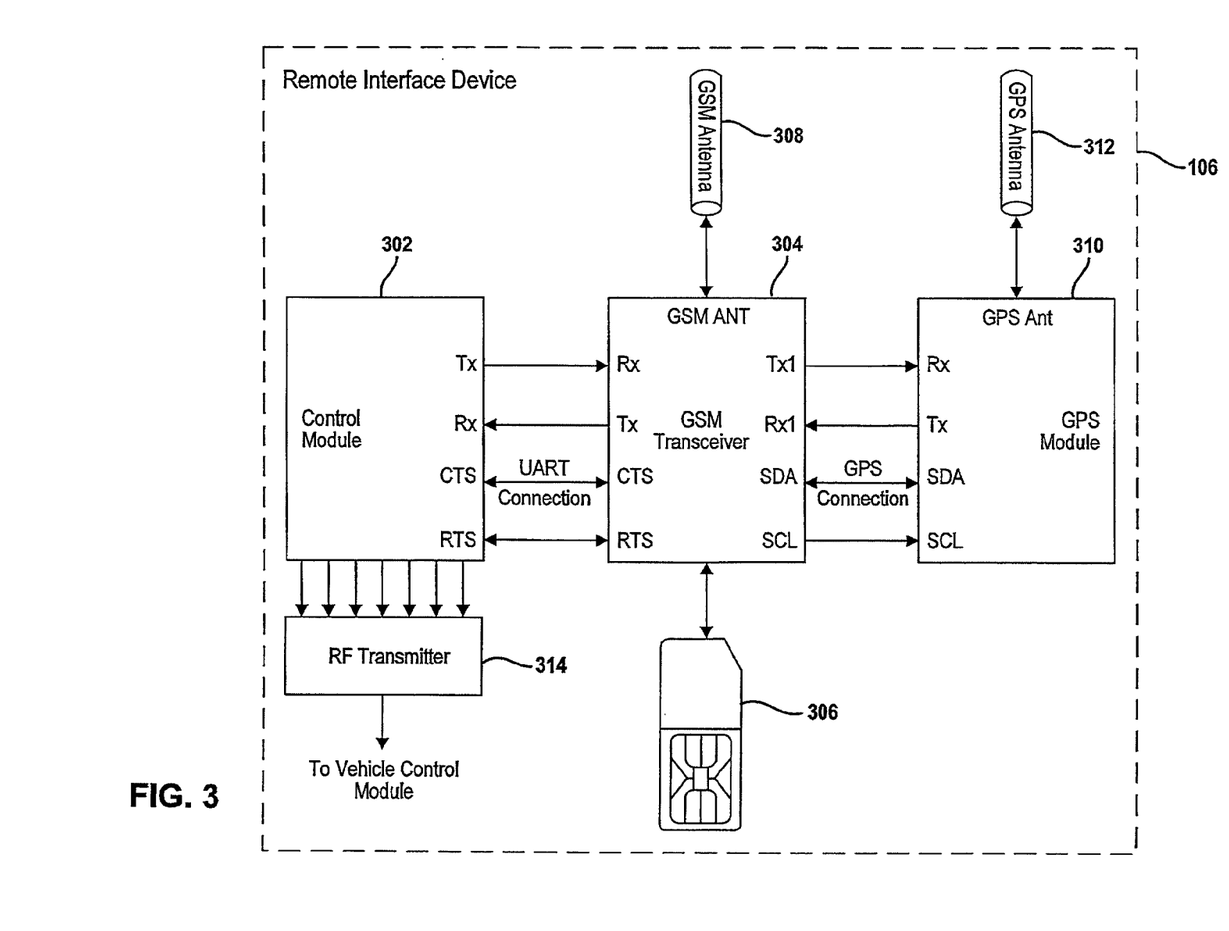
FIG. 3 is a block diagram of the remote interface device.

With reference to FIG. 3, an example of a block diagram of the remote interface device 106 is illustrated. The remote interface device 106 includes a control module 302, a global system for mobile (GSM) transceiver 304, a subscriber identity module (SIM) card 306, a global positioning system (GPS) module 310, and an RF transmitter 314. The GSM transceiver 304 includes a GSM antenna 308 and the GPS module 310 includes a GPS antenna 312.

The control module 302 includes a microcontroller. In an example embodiment, the control module 302 may be a PIC32 microcontroller, and may be referred to as the "PIC32" hereinafter. The present disclosure is applicable to other microcontrollers, and is not limited to the PIC32.

Figure 4:
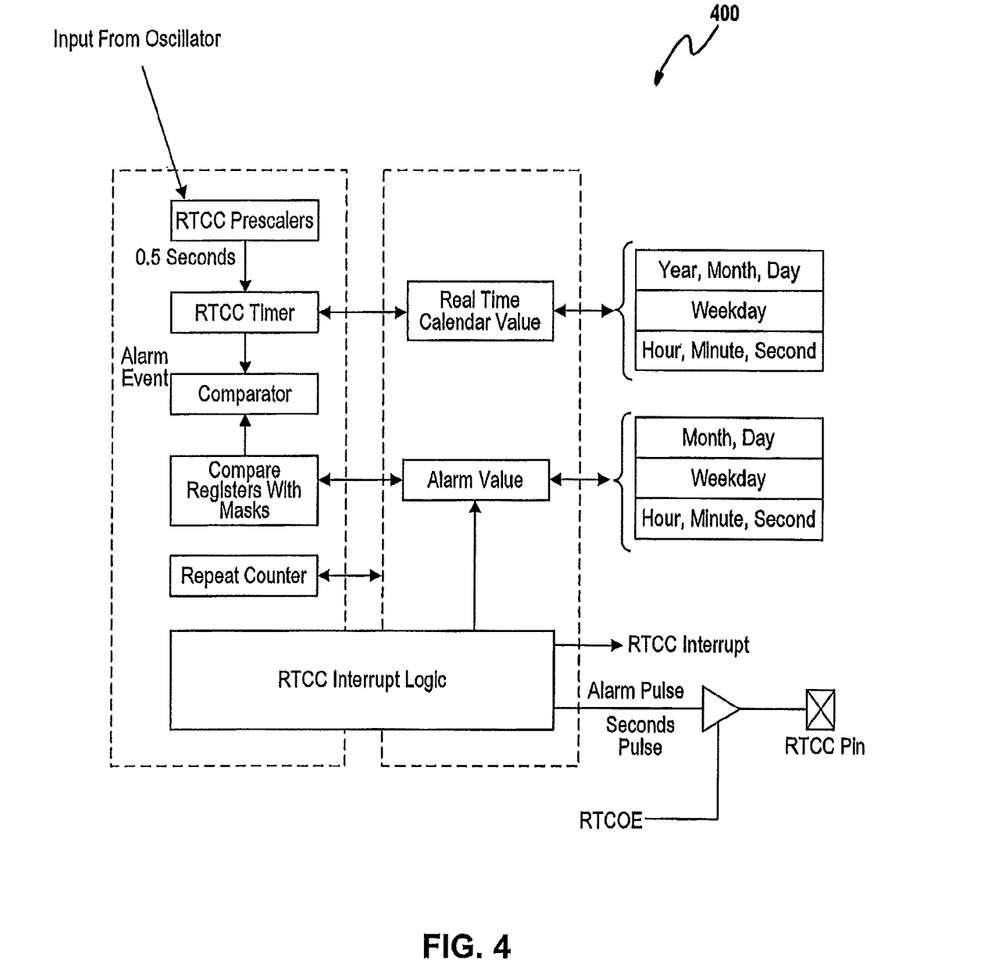
FIG. 4 is a block diagram of an example real-time clock and calendar module implemented by a microcontroller of the remote interface device.

The control module 302 includes a standalone real-time clock and calendar (RTCC) module for maintaining accurate time. With reference to FIG. 4, an example of a RTCC module 400 is illustrated. The RTCC module 400 may provide the following information: time in hours, minutes, and seconds; calendars for weekdays, date, months, and years; and features for configuring alarms. The RTCC module 400 of the control module 302 is used to support an auto start/stop of the vehicle. Specifically, the RTCC module 400 provides accurate timing that may be used to configure alarms or start the engine of the vehicle at a pre-defined date and time. That is, the user may be able to set-up a pre-determined date and time at which the vehicle is to perform a specific operation. For example, the user may request automatic start of the engine at 7:00 AM on Sundays. The RTCC module 400 accurately monitors the date and time, thereby allowing the control module 302 to perform a preset operation at the pre-determined date and time. Additionally, the RTCC module 400 is optimized for low power, which provides extended battery life while keeping track of time.

The control module 302 may have multiple universal synchronous receiver/transmitter (UART) ports. One of the UART ports is used to connect the control module 302 to the GSM transceiver 304 for allowing communication between the control module 302 and the GSM transceiver 304 by way of, for example, AT commands transmitted over the serial bus. The serial connection supports the hardware (HW) flow control using clear to send (CTS) and ready to send (RTS) flow control signals which provide extra protection by enabling the 'handshake' of the UART protocol.

The control module 302 also includes several I/O ports, digital and analog, for connecting to the RF transmitter 314. The inputs/output ports of control module 302 can be configured as an open drain. The open drain feature allows the generation of outputs higher than VDD (for example, 5V) on any desired 5V-tolerant pins by using external pull-up resistors. This allows the remote interface device 106 to connect to any remote device that has a voltage ranging from 0 to 5 volts.

The GSM transceiver 304 includes a processor and is the main unit to connect the remote interface device 106 to the outside world. In an example embodiment, the processor may be a LEON-G200 module. The GSM transceiver 304 connects the remote interface device 106 to the Internet by activating a general packet radio service (GPRS) network. GPRS is a packet oriented mobile data service on a 3G cellular communication system. GPRS allows the remote interface device 106 to connect to the Internet (e.g., network 108) and establish a connection with the distribution center 104.

In the example embodiment, the GSM transceiver 304 may contain the following features: UART communication; a network indicator, a 3G antenna connector, and embedded TCP/IP. The UART communication allows the GSM transceiver 304 to communicate with the control module 302. Accordingly, the GSM transceiver 304 is physically connected to the control module 302 via a UART port. The network indicator notifies the user if the remote interface device 106 is under coverage or not. The 3G antenna connector allows the remote interface device 106 to receive a 3G signal. The embedded TCP/IP allows the remote interface device 106 to communicate with clients via TCP/IP.

The GSM transceiver 304 is also connected to the GPS module 310. The GPS module 310 includes a processor such as a NEO-6Q. The GPS module 310 reports the accurate location of the vehicle to users by sending the GPS data, which includes the latitude and longitude of the current location of the target vehicle. The connection between the GSM transceiver 304 and the GPS module 310 is achieved using a display data channel (DDC) interface. The DDC (Display Data Channel) is an I2C compatible interface and can be used for serial communication with wireless modules, accessing external devices with a serial interface EEPROM, or interfacing with a host CPU. The DDC can be configured as a master mode or a slave mode.

The GSM transceiver 304 and the GPS module 310 require a valid carrier signal. The GSM transceiver 304 is connected to the SIM card 306 that supports GSM technology. The SIM card 306 provides a cellular signal to the GSM transceiver 304. In the example embodiment, the carrier provided of the SIM card uses the GSM technology, so that a GSM signal can be recognized by the GSM transceiver 304. Other types of cellular services, such as CDMA technology, also fall within the scope of the present disclosure.

The GSM antenna 308 is attached to the GSM transceiver 304, and the GPS antenna 312 is attached to the GPS module 310 in order to provide a faster data rate connection with the distribution center 104 and to maximize the signal coverage. The GSM antenna 308 and the GPS antenna 312 may be placed in the vehicle in such a way so as to maximize the signal strength.

In the example embodiment, specific processors were identified as part of the GSM transceiver 304 and the GPS module 310. However, other suitable processors may be used, and the present disclosure should not be limited to the processors described herein.

Next, the software (SW) design for the remote interface device 106 is provided. In the example embodiment, the SW components of the system 100 are identified as follows: the remote control software application 110, the remote interface device firmware, and the distribution center SW. The remote control software application 110 may be an application disposed on a smartphone for allowing the user to control the vehicle remotely and/or a PC application that controls the vehicle and configures the remote interface device 106 for first time use. The remote interface device firmware is the actual firmware and drivers that is running in the control module 302. The distribution center SW may be, for example, a Java TCP server application running on a server of the distribution center 104 with a static IP address. The distribution center SW organizes the process of exchanging data between the remote interface device firmware from one side and the remote control software application 110 from the other side.

In the example embodiment, communication between SW components may be handled using TCP protocol, or Secure Sockets Layer (SSL) over TCP. That is, the SW components may run its own TCP/IP stack, as each component would be configured to be either a TCP client or a TCP server. For example, the computing device 102 having the remote control software application 110 and the remote interface device 106 are configured as a TCP client and the distribution center 104 is configured as a TCP server. Other protocols may also be used and should not be limited to TCP.

Figure 5:
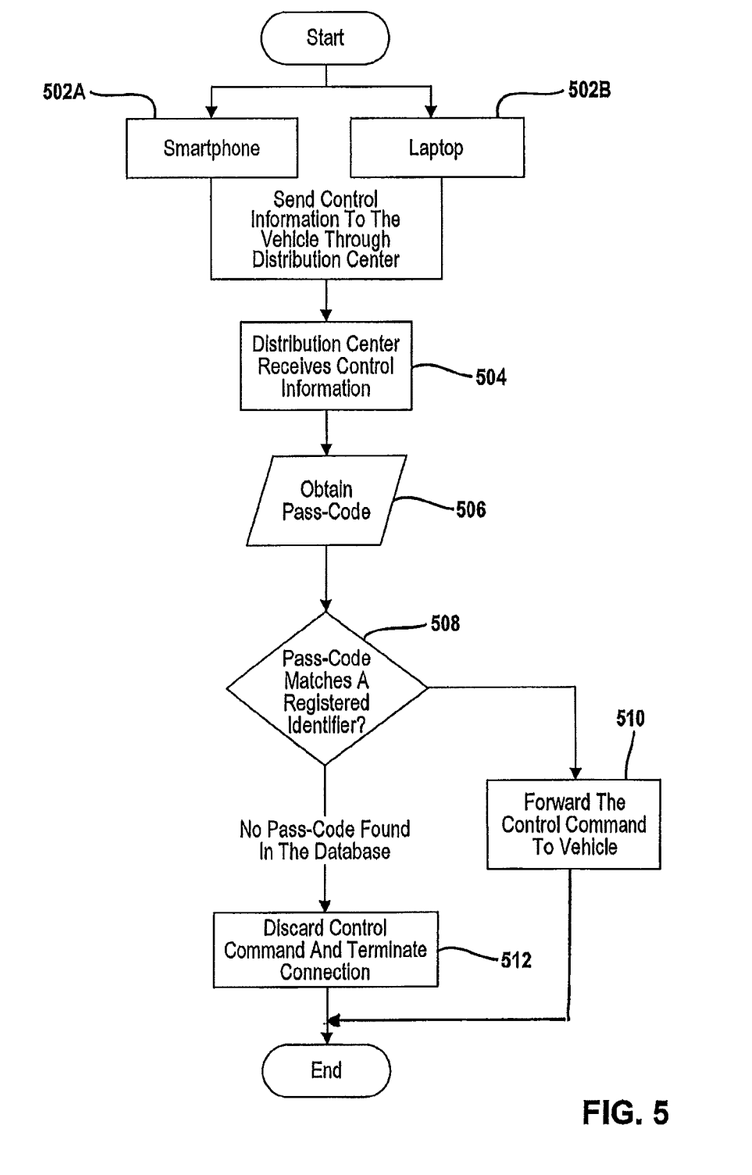
FIG. 5 is a flowchart illustrating data flow when sending a command from a computing device to a vehicle.

With reference to FIG. 5, a flowchart illustrates an example of data flow when a user attempts to send a control command to a target vehicle having the remote interface device 106. In the diagram, a smartphone and/or a laptop, as the computing device 102, sends control information to the distribution center 104 at 502A and 502B, respectively. The control information includes the control command and the unique pass-code associated with the remote interface device 106. In an example embodiment, the control command is provided as a specific control TCP identifier that is later translated by the control module 302. The distribution center 104 receives the control information at 504 and obtains the pass-code from the control information at 506.

At 508, the distribution center 104 determines whether the pass-code matches registered identifiers stored in the database for a particular vehicle. For example, the distribution center 104 compares the pass-code received to stored pass-codes that are associated with a particular remote interface device 106. If the pass-code matches, the distribution center 104 forwards the control command to the remote interface device 106 associated with the registered identifier at 510. After reviewing all of the pass-codes in the database, if the pass-code provided by the computing device 102 does not match any of the pass-codes stored in the database, the distribution server 104 discards the control information and terminates connection with the computing device at 512. While the distribution center 104 is described as transmitting the control command, the distribution center 104 may transmit the actual control information.

The control module 302 of the remote interface device 106 analyzes the control information from the distribution center 104 to determine an operation request based on the control command. For example, the control command may be transmitted as a specific control TCP identifier. The control module 302 translates the specific control TCP identifier to an operation request. As an example, the control module 302 may store a table that associates a given operation request to a control TCP identifier. Table 1, shown below, is an example of such mapping table.

TABLE 1

Mapping between the operation requests and the control TCP identifier provided in the control information.

| Operation Request | Control TCP Identifier |
|---|---|
| Engine on | "Command_0" |
| Engine off | "Command_1" |
| Look doors | "Command_2" |
| Unlock doors | "Command_3" |
| Open Trunk | "Command_4" |
| Activate panic alarm | "Command_5" |
| Custom command 1 | "Command_6" |
| Custom command 2 | "Command_7" |
| Set time and date | {"TIME", year, month, day, hour, minute, second, weekday} |
| Configure auto start engine feature | {"Alarm", "Sunday", "Monday", "Tuesday", "Wednesday", "Thursday", "Friday", "Saturday", hour, minute} |
| Request GPS data | "GPS" |
| Restore manufacturer settings | "Reset" |

Based on the operation request, the control module 302 transmits an RF signal indicative of the operation request to the vehicle control module 204 by way of the RF transmitter 314. For example, if the operation request indicates control of a component in the vehicle (e.g., engine, trunk, door lock), the control module 302 transmits a command signal indicative of the operation to the vehicle control module 204 for performing the requested action. If the operation request is related to, for example, location of vehicle or setting time and date for operating a vehicular component, the control module 302 performs the necessary steps to perform the requested action. For example, the microcontroller may set the time and date the vehicular component is to be operated. In another example, the control module 302 may transmit the location of the vehicle to the requester.

Figure 6:
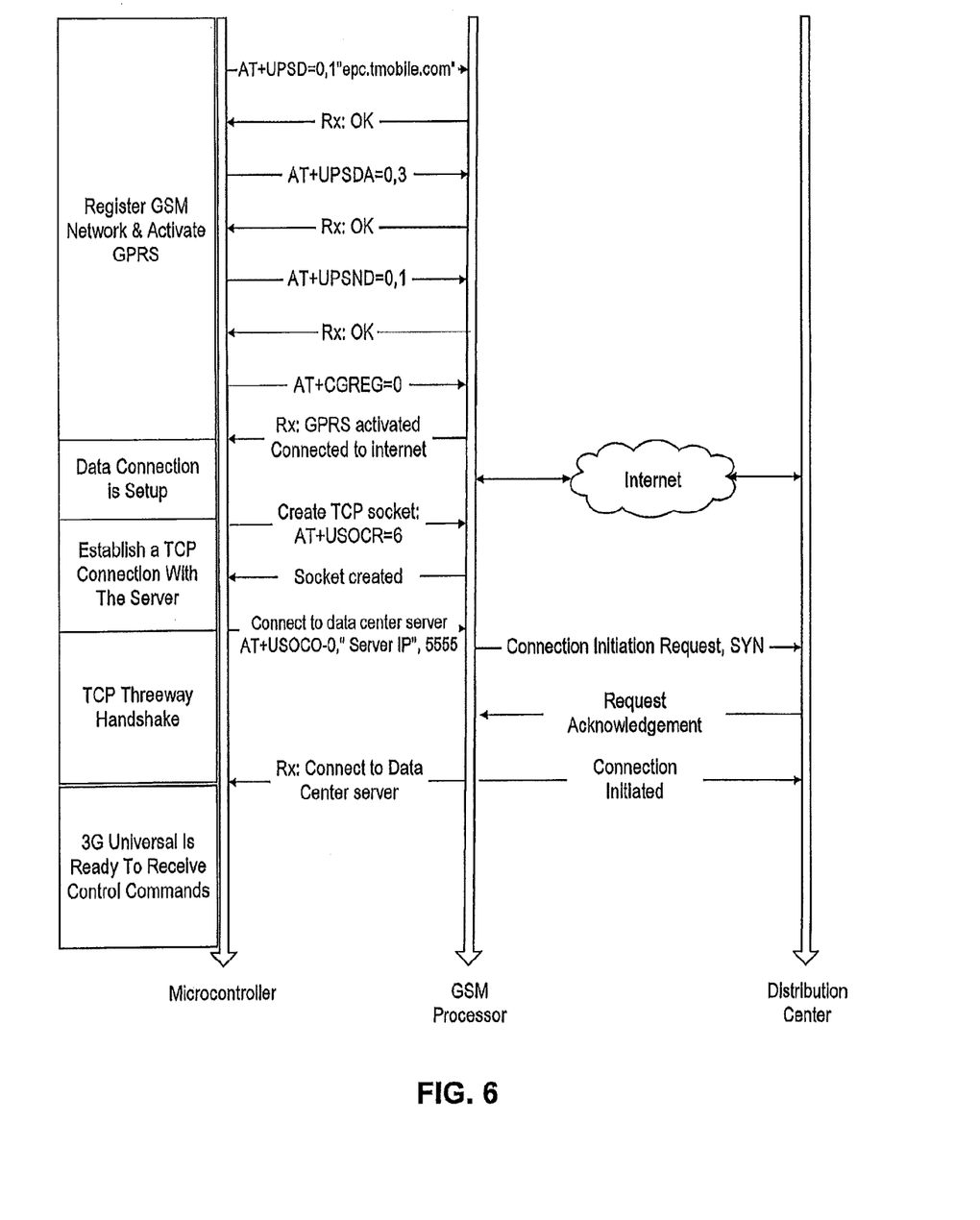
FIG. 6 is a diagram illustrating data flow for establishing a connection between the remote interface device and a distribution center.

An example of the software design of the remote interface device firmware executed by the control module 302 is provided. In an example embodiment, once the remote interface device 106 is turned on, the firmware initializes the UART port, and it starts sending AT commands to the GSM transceiver 304 to register the GSM network, activate the GPRS, and establish a TCP connection with the distribution center 104. With reference to FIG. 6, there are four steps that are executed by the GSM transceiver 304 in order to register the GSM network and activate the GPRS. The steps include: (1) set the Packet Switched Data (i.e., AT+UPSD); (2) set the Packet Switched Data Action (i.e., AT+UPSDA); (3) set the Packet Switched Network-Assigned Data (i.e., AT+UPSND); and (4) register the GPRS network (i.e., AT+CGREG). It should be readily understood that other methods/steps for registering the GSM transceiver 304 with the GSM network and activating the GPRS are also applicable to the present disclosure.

Once data connection is set up, the remote interface device 106, through the control module 302 and the GSM transceiver 304, establishes a TCP connection to the distribution center 104 using the server's IP address and a pre-defined port number. For example, the connection steps may include: (1) create a TCP socket (i.e., AT+USOCR=6); and (2) connect to the distribution center 104 (i.e., AT+USOCO=0, "Server IP Address" 5555).

Upon a successful connection of the remote interface device 106 to the distribution center 104, the distribution center 104 stores the pass-code of the remote interface device 106 in its database. This allows the distribution center 104 to redirect the command signal issued by the user to the target vehicle through the remote interface device 106. Simultaneously, the firmware running in the control module 302 sets up the GPS connection. For example, in an example embodiment, the control module 302 may send the following AT commands to the GPS module 310:

Initialize the GPS Profile: AT+UGPRF=0.
Enable GPS fix data: AT+UGGGA=1.
Enable geographic position: AT+UGGLL=1.
Enable satellite information: AT+UGGSA=1.
Enable GNSS satellites in view: UGGSV=1.
Enable course over ground and ground speed: AT+UGVTG=1.
Power on the GPS module, and set it to the "AssistNow offline" mode: AT+UGPS=1,4.

One of the features accessible to the user and supported by the remote interface device 106, is to determine a location of the vehicle. When the user requests the location, the control module 302 sends the request to the GPS module 310 via the GSM transceiver 304. For example, the control module 302 may send the request by way of a DDC channel of the GSM transceiver 304. In an example embodiment, the request may be the following AT command: Get recommended minimum GNSS data: AT+UGRMC. As a result of this request, GPS module 310 returns the GPS data (e.g., the latitude and longitude) to the control module 302, which transmits the data to the distribution center 104. The distribution center 104 then transmits the data to the computing device 102, which is accessible by the user. The computing device 102 may extract the latitude and the longitude from the TCP packet and launch, for example, Google Maps using the following hyperlink after replacing the "Latitude" and "Longitude" with actual values: https://maps.google.com/?q= Latitude, Longitude.

The computing device 102 attempts to connect to the distribution center 104 when a user sends a command via the remote control software application 110. As an example, the computing device 102 uses the distribution center's IP address (static IP address) and a port number (e.g., 6666) to connect to the distribution center 104, and the TCP three-way handshake takes place. Upon a successful completion of a TCP session with the distribution center 104, the computing device 102 sends control commands to the vehicle upon the user's request, and exchanges information with the remote interface device 106.

In operation, the system 100 allows the user to control their vehicle by way of the computing device 102. More particularly, when a user sends a control command, such as start the engine, the command travels to the distribution center 104 along with the pass-code of the remote interface device 106, which is installed in the target vehicle. If the distribution center 104 recognizes the pass-code, the distribution center 104 forwards the request to the remote interface device 106, and the remote interface device 106 transmits a signal indicative of the control command to the vehicle control module 204 for starting the engine of the vehicle.

The remote interface device 106 can support various features accessible by the user. For example, the remote interface device 106 is designed and implemented in such a way so as to support all features provided by the existing remote control and/or alarm system activated by a key fob, and make the features operable from, for example, a user's smartphone or computer. The remote interface device 106 also provides the user the current location of the vehicle via the GPS module 310.

The remote interface device 106 also supports two-way connection with the user by way of the distribution center 104. More particularly, the remote interface device 106 can notify the user that the command sent was received by the remote interface device 106 and the right action was taken. For example, if the user selects a control command for turning the engine ON by way of the computing device 102, the remote interface device 106 may transmit a message to the user by way of the distribution center 104 notifying the user that the control command was received and that the engine has started. The computing device 102 may provide a pop up window to display a message to the user.

By having the RTCC module, the remote interface device 106 may allow a user to set up an auto start/stop of the engine/alarm system. For example, when the control module 302 receives a request to operate a vehicle component at a desired time and date, the control module 302 may store the desired time and date and the associated operation in a memory. The control module 302 monitors the time and date by way of the RTCC module. When the time and date tracked by the RTCC module matches the time and date stored, the control module 302 transmits the signal indicative of the operation to be performed to the vehicle control module. Accordingly, the user may, for example, start and stop their vehicle automatically at predefined times on preselected days.

When installing the remote interface device 106, the user configures the remote interface device 106 to have the right response to the commands sent by the user. The procedure of configuring the remote interface device 106 may be performed by a computer, such as a laptop. The remote interface device 106 may be connected to any computer via, for example, TCP/IP protocol. The remote control software application 110 provided on the computer may have a special interface that allows the user to connect to the remote interface device 106 and set the common configurations.

Figure 7:
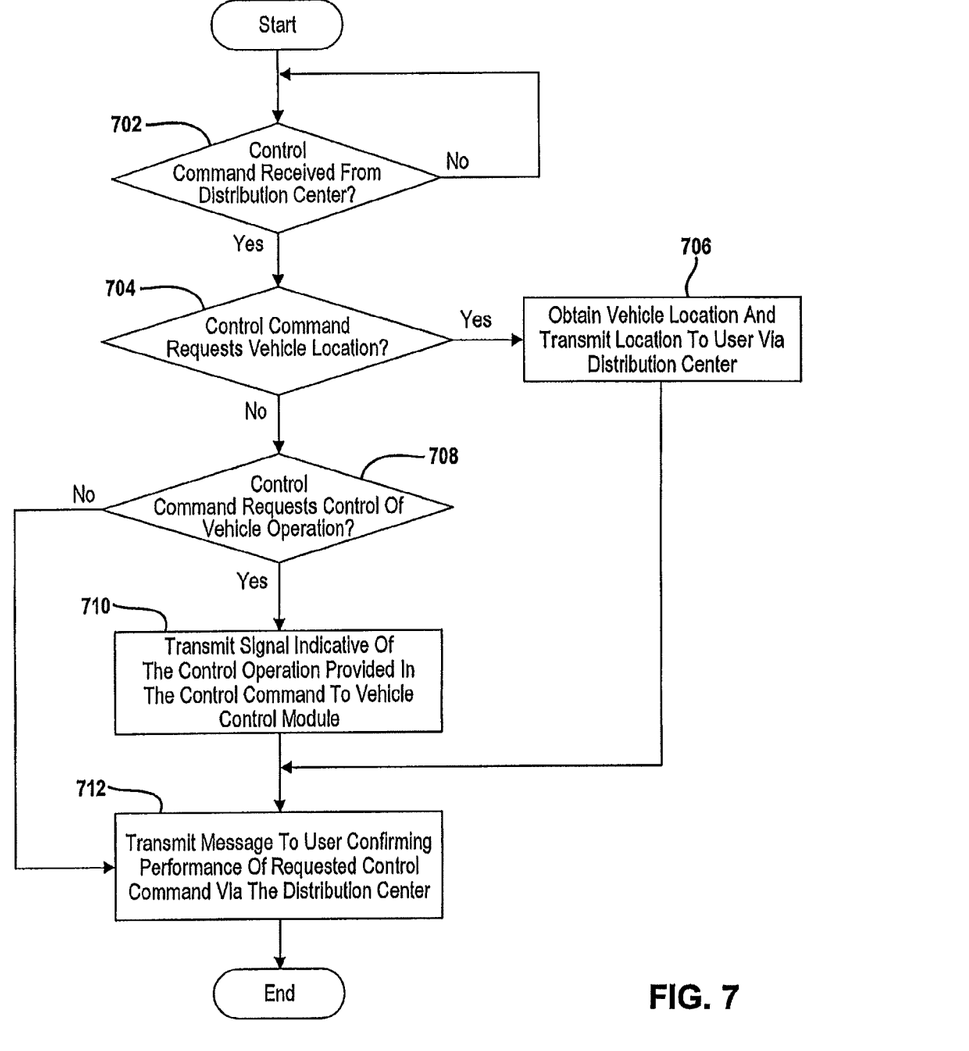
FIG. 7 is a flowchart of an example command control process performed by the remote interface device.

With reference to FIG. 7, a flowchart of an example command process routine performed by the remoter interface device 106 is presented. The routine may begin when power is applied to the remote interface device 106 and after the remote interface device 106 is configured by the user.

At 702, the remote interface device 106 determines whether a control command is received from the distribution center 104. For example, the GSM transceiver 304 may receive a signal from the distribution center 104 via the GSM antenna 308 and the SIM card 306. The remote interface device 106 may also receive the control information transmitted to the distribution center 104. The remote interface device 106 may continue to monitor the arrival of the control command if no command is received.

If a control command is received, the remote interface device 106 determines at 704 whether the control command requests a location of the vehicle. For example, the remote interface device 106 compares a control TCP identifier provided in the control command with pre-stored mapping information that associates a given operation request with a given control TCP identifier. If the control command requests a location, the remote interface device 106 obtains the location via the GPS module 310 and transmits the location to the user via the distribution center at 706.

If the control command does not request vehicle location, the remote interface device 106 determines whether the control command requests a control of a vehicle operation at 708. If the control command requests control of a vehicle operation, such as starting/stopping an engine, the remote interface device 106 transmits a signal indicative of the requested control command to the vehicle control module at 710.

The vehicle control module executes the command as if the command was received from, for example, a key fob once it is received. At 712, the remote interface device 106 transmits a signal to the user confirming performance of the requested control by way of the distribution center 104.

The routine provided in FIG. 7 is just one example of a process performed by the remote interface device 106. The remote interface device 106 may perform different processes for analyzing a control command. For example, a routine may be provided in which the remote interface device 106 analyzes the control command to determine if the command sets a predetermined date and time for a particular action.

The remote interface device 106 of the present disclosure allows a user to remotely control the vehicle by way of a computing device 102 that is positioned outside of short communication range of the vehicle. The remote interface device 106 transmits a signal that a general key fob having the remote control feature would transmit to the vehicle control module within the vehicle. Accordingly, the remote interface device 106 does not require complex rewiring of the vehicle.

The foregoing description is merely illustrative in nature and is in no way intended to limit the disclosure, its application, or its uses. The broad teachings of the disclosure can be implemented in a variety of forms. Therefore, while this disclosure includes particular examples, the true scope of the disclosure should not be so limited, since other modifications will become apparent upon a study of the drawings, the specification, and the following claims. It should be understood that one or more steps within a method may be executed in different order (or concurrently) without altering the principles of the present disclosure. Furthermore, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

What is claimed is:

1. A remote operation system for remotely controlling a vehicle, the system comprising:
a RF receiver residing in a vehicle and configured to receive RF commands via an RF communication link; and
a remote interface device installed in the vehicle and packaged in a housing separate from the RF receiver, wherein the remote interface device includes:
a cellular transceiver residing in the housing and configured to receive a given command via a cellular communication link,
a RF transmitter residing in the housing and configured, in response to receiving an electrical signal, to transmit a RF command over the RF communication link to the RF receiver, and
a controller residing in the housing and interfaced directly with the cellular transceiver and the RF transmitter, wherein the controller retrieves the given command from the cellular transceiver, and translates the given command to a RF command defined by a manufacturer of the vehicle, wherein the controller is electrically connected to the RF transmitter via an I/O port configured as open drain outputs and interacts with the RF transmitter to send the RF command to the RF receiver by sending the electrical signal via the I/O port to the RF transmitter.

2. The remote operation system of claim 1 wherein the controller translates the given command based on a predefined command table that associates multiple commands with an operation request, and transmits the RF command indicative of the operation request that is associated with the given command.

3. The remote operation system of claim 1 further comprises a subscriber identification module interfaced with the cellular transceiver and operates to store an international mobile subscriber identity.

4. The remote operation system of claim 1 further comprises:
a remote control device that is operable by a user to issue the given command; and
a distribution center that is located remotely from the remote control device and the remote interface device, wherein the distribution center receives the given command from the remote control device via a wireless network and forwards the given command to the remote interface device via the cellular communication link.

5. The remote operation system of claim 4 wherein:
the remote control device identifies a recipient of the given command by way of an identifier; and
the distribution center validates the identifier based on pre-stored information that associates one or more registered identifiers with a respective remote interface device.

6. The remote operation system of claim 4 wherein the remote control device is a computing device having a remote control software application disposed therein.

7. The remote operation system of claim 4 wherein the remote control device and the distribution center communicate in accordance with a transmission control protocol.

8. The remote operation system of claim 4 wherein the remote interface device communicates with the remote control device by way of the distribution center.

9. The remote operation system of claim 1 wherein the given command indicates at least one of a start engine request, a stop engine request, an unlock door request, and a lock door request.

10. The remote operation system of claim 1 wherein:
the given command includes information indicative of a control operation to be performed and a set time and date at which the control operation is to be performed, and
the remote interface device transmits the RF command to the RF transmitter at the set time and date provided in the given command.

11. The remote operation system of claim 1 wherein:
the given command is a location request of the vehicle from a remote control device, and the remote interface device determines the location of the vehicle based on a global positioning system provided in the vehicle and transmits the location to the remote control device.

12. The remote operation system of claim 1 wherein the remote interface device is connected to a 12V outlet in the vehicle.

13. A remote interface device located in a vehicle for controlling the vehicle based on a control command provided by a remote control device via a distribution center, the remote interface device comprising:
- a transceiver including a processor and an antenna, wherein the transceiver receives the control command via cellular communication link;
- a RF transmitter, in response to an RF command signal, communicates with a RF receiver disposed in the vehicle; and
- a control module coupled to the transceiver and to the RF transmitter, wherein the control module determines an operation request of the vehicle based on the control command and transmits a RF command signal indicative of the operation request to the RF receiver via the RF transmitter when the operation request is to operate a component in the vehicle, wherein the control module is electrically connected to the RF transmitter via an I/O port configured as open drain outputs and transmits the RF command signal via the I/O port to the RF transmitter, wherein the transceiver, the RF transmitter and the control module are packaged in a housing separate from the RF receiver.

14. The remote interface device of claim 13 wherein the transceiver includes a global service mobile processor and a global service mobile antenna.

15. The remote interface device of claim 13 further comprises a subscriber identification module interfaced with the transceiver and operates to store an international mobile subscriber identity.

16. The remote interface device of claim 13 wherein the control module includes a real-time clock and calendar module to monitor time and date.

17. The remote interface device of claim 13:
- the control command includes information indicative of a control operation to be performed and a set time and date at which the control operation is to be performed, and
- the control module transmits the RF command signal to the RF receiver at the set time and date provided in the control command.

18. The remote interface device of claim 13 further comprising:
- a global positioning system coupled to the transceiver, wherein:
- the control command is a location request of the vehicle, and
- the control module receives the location of the vehicle from the global positioning system by way of the transceiver, and transmits the location to the remote control device by way of the cellular communication link.

\* \* \* \* \*